United States Patent [19]

Tyler

[11] Patent Number: 4,726,727

[45] Date of Patent: Feb. 23, 1988

[54] SUPPORT DEVICE FOR DISABLED VEHICLE TIRE

[76] Inventor: Raymond Tyler, 292, Rang de l'Eglise, Ste-Angèle-de-Monnoir, Quebec, Canada, J0L 1P0

[21] Appl. No.: 921,126

[22] Filed: Oct. 21, 1986

[30] Foreign Application Priority Data

Oct. 22, 1985 [CA] Canada .................................. 493520

[51] Int. Cl.[4] .............................................. B60B 29/00

[52] U.S. Cl. .................................. 414/430; 188/4 R; 188/5; 280/79.1 A

[58] Field of Search ..................... 280/79.1 R, 79.1 A; 414/430; 188/4 R, 4 B, 5, 6, 7

[56] References Cited

U.S. PATENT DOCUMENTS

| | | | |
|---|---|---|---|
| 607,329 | 7/1898 | Beebe | 414/430 |
| 863,122 | 8/1907 | Weber | 414/430 |
| 1,970,159 | 8/1934 | Zehnbauer | 414/430 |
| 2,228,689 | 1/1941 | Collins | 414/430 |
| 2,259,399 | 10/1941 | Sutter | 414/430 |
| 2,350,118 | 5/1944 | Knapp | 414/430 |
| 2,358,864 | 9/1944 | Lockwood | 414/430 |
| 2,476,837 | 7/1949 | Cline | 280/79.1 X |
| 2,552,804 | 5/1951 | Morris | 414/430 |
| 2,573,728 | 11/1951 | Pugh, Sr. | 414/430 |
| 3,145,860 | 8/1964 | Graves | 414/430 |
| 3,224,611 | 12/1965 | Smuck | 414/430 |
| 3,285,447 | 11/1966 | Junion | 414/430 |
| 4,121,788 | 10/1978 | McMahon | 414/430 |
| 4,465,421 | 8/1984 | Murillo | 414/430 |

*Primary Examiner*—John J. Love
*Assistant Examiner*—Michael Mar
*Attorney, Agent, or Firm*—Robert J. Koch

[57] ABSTRACT

The device comprises a body which is adapted to receive and hold the disabled vehicle tire. Wheels or other rolling devices enable the body to ride on a hard surface. A ramp is provided to enable to drive the disabled vehicle tire onto the body to rest thereon. Two braking systems are provided to prevent any movement of the body while mounting and dismounting the disabled vehicle tire onto and from the body. Finally, the body can be connected to the automobile by means of an attachment, such as a chain after having mounted the disabled tire onto the body. In this manner, the driver of the automobile will be able to drive his car while pulling the body while the disabled vehicle tire is carried by it.

5 Claims, 6 Drawing Figures

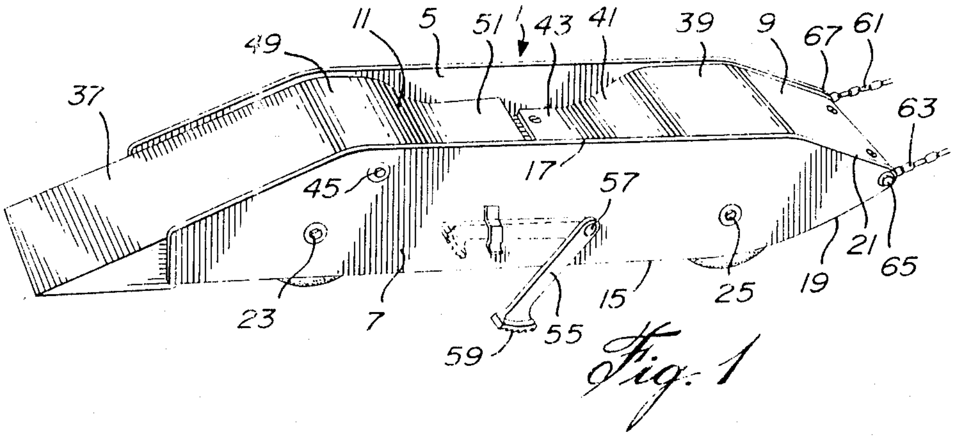
Fig. 1
Fig. 2
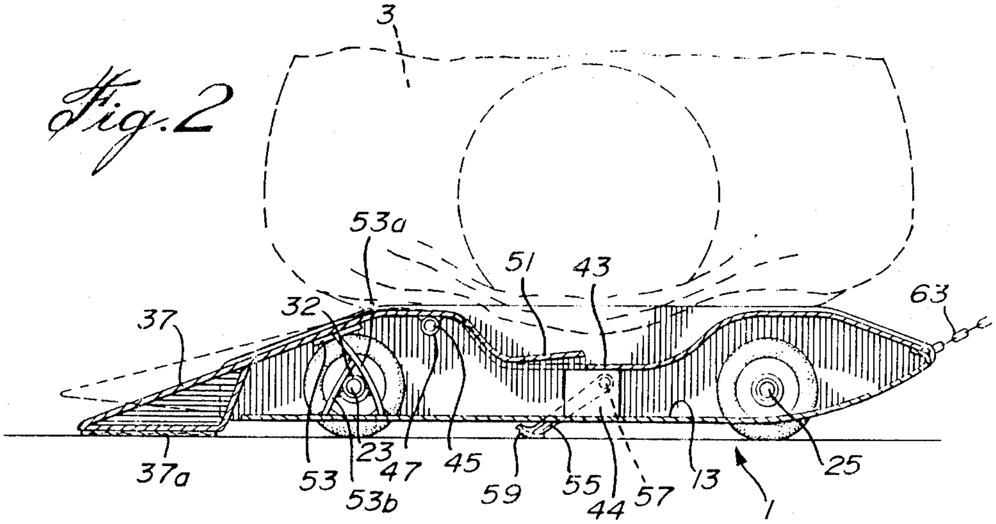
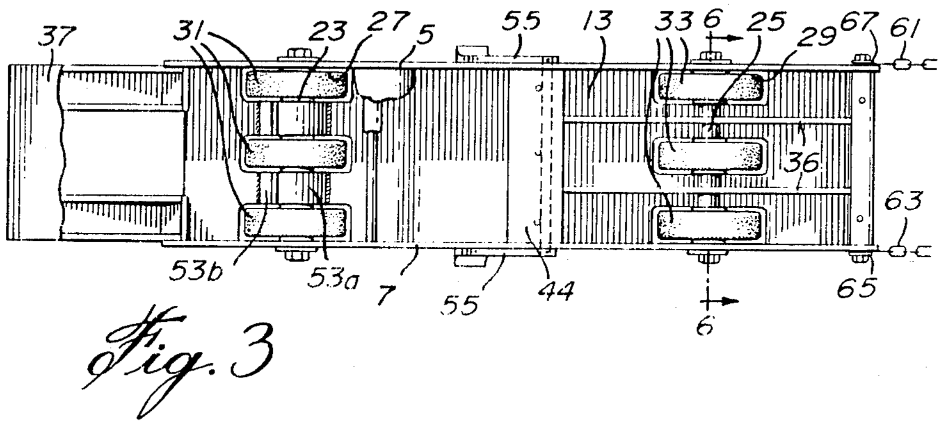
Fig. 3

SUPPORT DEVICE FOR DISABLED VEHICLE TIRE

This invention relates to a support device for disabled vehicle tire. More particularly, the invention is concerned with an apparatus which enables to mount a disabled vehicle tire thereon and to drive an automobile vehicle equipped with such a device to the next service station. This device saves the hardship associated with jacking a car, removing the wheel with a disabled tire and mounting a spare tire and wheel on the vehicle.

It is well known that a flat tire always give rise to a multiplicity of problems. The standard technique which has not evolved for many decades, involves the finding of a reasonable safe parking area, the jacking of the car to free the wheel with the damaged tire, the removal of the wheel and the mounting of a spare wheel and tire. Normally, once this is achieved, it is recommended to drive to the next service station to repair the disabled vehicle tire.

Many new cars come equipped with a spare tire which will only be used to drive to the next service station. This appears to be the only modification over the well established routine involved with the removal of a disabled tire. The types of jacks have also varied to a large extent but the procedure has remained the same.

The prior art is replete with trucks or dollies enabling to engage the tire of an automobile vehicle. Such devices are disclosed in the following U.S. patents:

U.S. Pat. Nos. 863,122—Aug. 13, 1907—Weber
1,970,159—Aug. 14, 1934—Zehnbauer
2,228,689—Jan. 14, 1941—Collins
2,259,399—Oct. 14, 1941—Sutter
2,358,864—Sept. 26, 1944—Lockwood
2,552,804—May 15, 1951—Morris
2,573,728—Nov. 6, 1951—Pugh, Sr.
3,285,447—Nov. 15, 1966—Junion
4,121,788—Oct. 24, 1978—McMahon
4,465,421—Aug. 14, 1984—Murillo The Weber device has been designed to handle vehicles mostly in garages and repair shops. Although in theory it could be used to mount a disabled vehicle tire, it is so deficient in many characteristics that it could not be used to achieve the purposes according to the invention. For example, loading and unloading would be very difficult, if not impossible and driving a car with one wheel mounted thereon would be so complicated that it would have no practical use.

The device disclosed in U.S. Pat. No. 1,970,159 affords no suitable braking system which is essential in a device to mount a disabled vehicle tire. In addition, because of its design, this device would be dangerous.

Although disclosing related trucks and dollies, the apparatuses illustrated in the other references are all more or less deficient in achieving the results sought by the present invention.

It is an object of the present invention to provide a support device for disabled vehicle tire which is less dangerous and easier to operate than the presently available devices.

It is another object of the present invention to provide a device which can be used even by women and older people, and dispense with the removal of tire studs.

According to the invention, there is provided a support device for a disabled vehicle tire of an automobile or the like, comprising a body adapted to receive and hold the disabled vehicle tire, rolling means enabling free riding of the body on a hard surface, and ramp means enabling to drive the disabled vehicle tire onto the body to rest thereon. There are also provided first and second braking means to prevent any movement of the body while mounting and dismounting the disabled vehicle tire onto and from the body, and means to attach the body on the automobile after having mounted the disabled tire onto the body, thereby enabling to drive the automobile while pulling the body with the disabled vehicle tire carried by the body.

In accordance with a preferred embodiment of the invention, the body comprises a pair of longitudinally extending vertical plates held together in parallel fashion, and a concave supporting member disposed between the vertical plates, so constructed and arranged that the disabled vehicle tire can rest on the concave support while being laterally engaged by the vertical plates, the weight being equally distributed between front and rear wheels.

In accordance with another preferred embodiment of the invention, the vertical plates have a lower edge and a top edge, the lower edge of both vertical plates upwardly curving at the front end thereof to the top edge to form a curved front end of the body, the vertical plates being at least partly held together by means of a longitudinal plate like member fixedly engaging substantially the entire lower edges of the vertical support.

In accordance with another preferred embodiment of the invention, the device comprises a first and a second axle transversely and fixedly mounted o the body between the vertical plates, the axles being disposed above the longitudinal plate like members. Longitudinal slots are formed in the longitudinal plate like members opposite the axles. Multiple free rolling wheels are mounted on the axles and extend past the longitudinal plate like members through the slots, so as to permit free riding of the support device upon being pulled. In the event of hitting rough road or pot holes, the flat uncluttered bottom surface would generally slide through while the devices of the prior art could stick or break in a similar circumstance.

In accordance with another preferred embodiment of the invention, the support device comprises three free rolling wheels on the rear axle, three free rolling wheels on the front axle and a corresponding number of longitudinal slots formed on the longitudinal plate like member.

In accordance with another preferred embodiment of the invention, the concave supporting member comprises a fixedly mounted forward portion and a pivotable rearward portion which is associated with the ramp means.

The invention will now be illustrated more in details with reference to the annexed drawings describing a preferred embodiment, but given only by way of illustration. In the drawings:

FIG. 1 is a perspective view of a support device for disabled tire according to the invention;

FIG. 2 is a longitudinal cross-section view of the same device with a disabled tire mounted thereon;

FIG. 3 is a view from underneath the same device;

Figure 6:
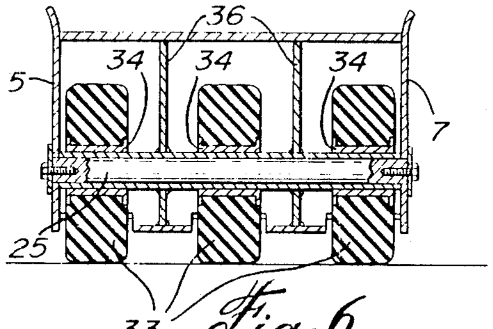
FIG. 6 is a section taken through line 6—6 of FIG. 3.

With reference to the drawings, it will be seen that the support device according to the invention comprises a body 1 which is adapted to receive and hold a disabled vehicle tire 3. With reference to FIGS. 1, 2 and 3, it will be seen that the body 1 mainly consists of a pair of longitudinally extending vertical plates 5 and 7 which are held together in parallel fashion as will be discussed later. Additionally, the body 1 comprises a forward portion 9, a rearward portion 11 and a longitudinal base plate member 13.

For the purpose of this description, the end of the support devices which appear at the right of FIGS. 1, 2 and 3 will be called the front end while the opposite end will be called the rear end. We shall now discuss the vertical plates more in details. It should of course be understood that they are both identical since they are mounted in parallel to another. Each vertical plate 5,7 therefore has a front end and a rear end. The plate has a lower edge 15 and an upper edge 17 as shown in FIG. 1. The lower edge 15 upwardly curves at the front end as shown at 19, until it meets the top edge, which as shown in the drawings, slightly curves downwardly at 21. In this manner, the front end of the body is curved which should allow free forward movement of the support device even when small obstacles are present in front of it. The device according to the invention works also well during winter and under snow conditions because of its particular shape.

The vertical plates 5,7 are held together by means of the longitudinal base plate 13 which is fixedly engaged such as by welding or the like substantially along the entire lower edges 15 of the vertical plates 5,7.

Two axles 23,25 are transversely and fixedly mounted on the body between the vertical plates 5 and 7, all in known manner. As shown, these axles 23,25 are disposed above the longitudinal base plate 13 close to the lower edge 15 of the vertical plates 5,7. Opposite the two axles 23 and 25, there are formed in the longitudinal base plate 13, three longitudinal slots 27 and three longitudinal slots 29. Three free rolling wheels 31 are mounted on bushings 32 which in turn rotate around axle 23. The wheels 31 slightly extend past the longitudinal base plate 13 through slots 27. The extensions are more particularly shown in FIGS. 1 and 2. Similarly, three additional free rolling wheels 33 are mounted on the axle 25, by means of bushings 34, which in turn rotate around axle 25. The wheels 33 slightly extend past the longitudinal base plate 13 through the slots 29. These wheels obviously permit free riding of the support device upon being pulled by chain. Because of its closed-in design, the device according to the invention differs from previous models in that there is less danger for hurting fingers, hands or getting caught in other road obstructions. To firmly hold axle 25 in place there are provided vertical plates 36 which are shown in FIGS. 3 and 6.

We shall now refer to the forward portion 9 and the rearward portion 11. First, we should mention that the forward portion 9 is fixedly mounted relative to the body 1 and more specifically the base plates 5,7 while the rearward portion is pivotable and is associated with a ramp 37.

The forward portion 9 has a front part 39 which is substantially levelled with the top edges 17 of the vertical plates 5,7. The forward portion 9 also has a rear part 41 which, as more particularly shown in FIGS. 1 and 2, downwardly curves and terminates in a short flat horizontal portion 43 at a level which is between the top edges 17 and the longitudinal base plate 13.

Before further describing the pivotable rearward portion 11, it should be mentioned that a shaft 45 is disposed towards the rear end of the body 1 between the vertical plates 5 and 7, immediately below the top edges 17 thereof. The pivotable rearward portion 11. which is associated with a ramp 37, is made of a flat member which is shaped as shown in FIGS. 1 and 2. This flat member has a sleeve 47 formed on its underface. It will be seen that the shaft 45 is inserted in the sleeve 47 to permit pivoting of the flat member 11 about the shaft 45.

The flat member constituting the rear portion 11 has a rear extension to define a ramp 37. As shown, this rear extension is located past the rear end of the support device. The extremity of the rear extension is adapted to rest against the hard surface (not shown) while the support device is in non-operating position. This ramp 37 defines a regularly inclined riding surface which extends to a point 49 opposite the sleeve 47. Past that point 49, the rearward portion 11 downwardly curves as shown in FIGS. 1 and 2 and terminates in a short flat horizontal portion 51. It will be seen that this short horizontal portion 51 is movable as a result of the pivoting of the rearward portion 11 from the position illustrated in dotted lines in FIG. 2 which is spaced above the flat horizontal portion 43 when a disabled vehicle tire 3 is being driven over the ramp 37. After the tire has been mounted on the support device, the rearward portion 11 pivots to the position illustrated in full line in FIG. 2 where the flat portion 51 rests against the flat portion 43, the latter being supported on box-like transverse channel member 44 disposed inside the support device. This is the position when the disabled vehicle tire has been completely mounted on the support device.

It has been mentioned above that in order for this device to be operative, it must be provided with a two-tier braking system. The first brake comprises a shoe 53 which is formed underneath the rearward portion 11 adjacent the sleeve 47 so as to rest against the rear wheels when the disabled vehicle tire is being driven over the ramp 37. After the disabled tire 3 has been mounted on the support device 1, the shoe 53 is disengaged because of the pivoting action of the rearward portion 11 which adopts the position illustrated in full line in FIG. 2. The net result is that the device will not move when loading a disabled vehicle tire thereon. After loading, it will be free rolling as a result of the disengagement of the brake shoe 53.

In order to prevent the shoe 53 from crushing and damaging wheels 31, there are provided rearwardly slanted plate 53*a* which terminate just short of ramp 37. When driving a disabled tire over ramp 37, the brake shoe 53 rests against wheels 31 to stop any forward or rearward movement of the support device. As a safeguard against damaging the wheels 31 and the axle 23, the slanted plate 53*a* limits the downward movement of the shoe 53. To further ensure that tbe vehicle does not move when driving tire 3 over the ramp 37, a braking plate 37*a* is provided underneath ramp 37, to contact the ground when driving a disabled tire over the ramp 37.

To make sure that the slanted plate 53*a* does not bend when it abuts ramp 37, there is provided a brace plate 53*b*.

The second brake consists of two braking arms 55 which are mounted alongside vertical panels 5 and 7. The arm is articulated at 57 to be moveable from an upward position illustrated in dotted lines in FIG. 1 to an operative position illustrated in full line in FIGS. 1 and 2. It will also be noted that the lower extremity of the arm 55 is provided with ground engaging teeth 59 so that when it is intended to unload the disabled vehicle tire 3, the braking arm is pivoted to engage its teeth with the hard surface, thereby preventing the device from moving in reverse direction during this unloading.

Figure 4:
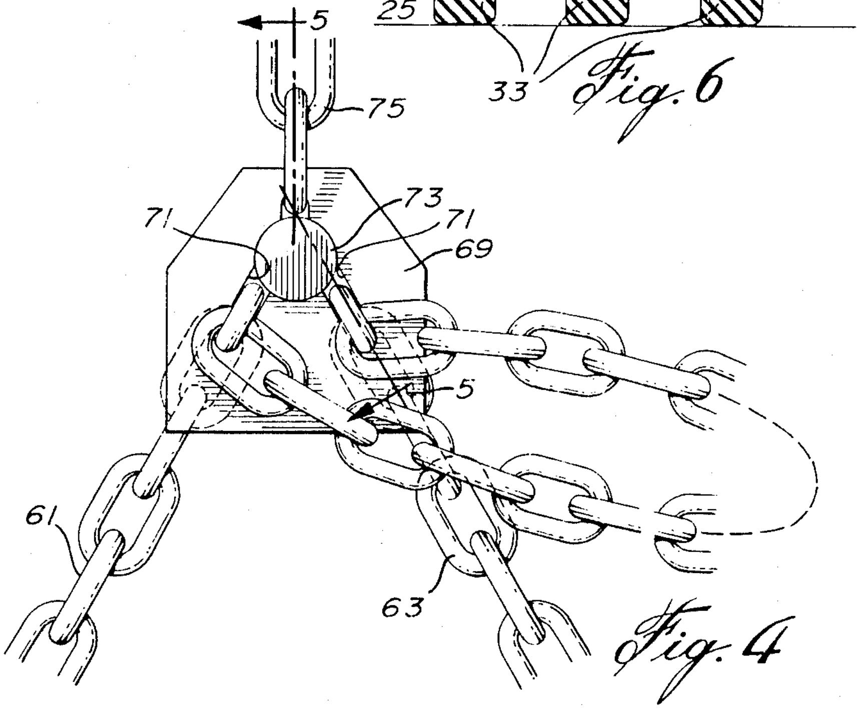
FIG. 4 is a view of a chain connector for the device illustrated in FIGS. 1, 2 and 3.
Figure 5:
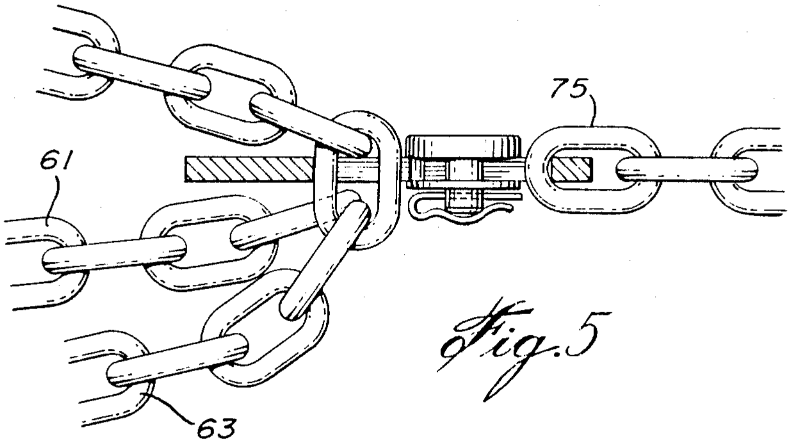
FIG. 5 is a section taken through line 5—5 of FIG. 4.

Of course, the support device which has just been described has to be attached to the car to be operative. For this purpose, there is provided a chain at the forward end of the support device. A chain is indeed important because it reduces the possibility of secondary accidents and it allows for offset installations and adjustments. Referring to FIGS. 4 and 5, this chain comprises two chain lengths 61,63. Each is attached at a respective front corner 65,67 of the body 1. The chain system comprises a connector plate 69 which has an inverted V-shaped slot 71 formed therein. Also, there is an enlargement 73 at the apex of the inverted V-shaped slot. This enlargement 73 enables to pass the chain therethrough and to lockingly introduce a link into one of the legs of the inverted V-shaped slot. This permits to adjust the distance of a specific length 61,63 which is requested between the body and the connector plate. The connector plate has an attachment 75 connected thereto by means of a chain and the latter is engaged in a hook not shown provided on the car.

Operation of the system is quite simple. Once a flat tire has been detected, it is merely necessary to place this support device ahead of the tire, to attach the chain to a hook suitable provided on the car, and then to slowly drive the flat tire until it adopts the position illustrated in FIG. 2. The car can thereafter be slowly driven to the next service station.

The embodiments of the invention in which an exclusive property or privilege is claimed are defined as follows:

1. A support device for a disabled vehicle tire of an automobile or the like, comprising:

a body which comprises a pair of longitudinally extending vertical plates held together in parallel fashion, said vertical plates having a lower edge and a top edge, the lower edge of both vertical plates upwardly curving at front end of said support device to said top edge to form a curved front end of said body, a concave supporting member disposed between said vertical plates, said concave supporting member comprising a fixedly mounted forward portion and a pivotable rearward portion, said concave supporting member enabling said disabled tire to rest thereon while being laterally engaged by said vertical plates, said vertical plates being at least held together by means of a longitudinal plate-like member fixedly engaging substantially the entire lower edges of said vertical plates, such that support device can travel unhindered through road deformation and extraneous material such as snow, said forward portion having a front part which is leveled with the top edges of said vertical plates, and a rear part which downwardly curves and terminates in a first short substantially flat horizontal portion at a level intermediate between said top edges and said longitudinal plate-like member, a first body and a second axle transversely and fixedly mounted on said body between said vertical plates, said axles being disposed above said longitudinal plate-like member, longitudinally slots being formed in said longitudinal plate-like member opposite said axles, free rolling wheels mounted on said axles and extending past the longitudinal plate-like member through said slots, so as to permit free riding of said support device upon being pulled and allowing for equal distribution of weight between front and rear wheels, a shaft disposed towards the rear end thereof between said vertical plates immediately below said top edges, said pivotable rearward portion comprising a flat member having a sleeve formed on the underface thereof, said shaft being inserted in said sleeve to permit pivoting of said flat member, said flat member having a rear extension past the rear end of said support device, the extremity of said rear extension resting against said hard surface in non-operating position of said support device, to define a regularly inclined riding surface extending to a point opposite said sleeve, after which said flat member downwardly curves and terminates in a second short substantially flat horizontal portion, said second short substantially flat horizontal portion being movable upon pivoting of said flat member from a first portion spaced above said first flat horizontal portion when said disabled vehicle tire is being driven over said ramp, to a second position where said second flat portion rests against said first flat portion when said disabled vehicle tire has been completely mounted on said support device, a brake shoe formed underneath said flat member to rest against said rear wheels when said disabled vehicle tire is being driven over said extension, and to be disengaged therefrom when said tire is in said support device, as a result of the pivoting of said flat member about said shaft, so that said device will not move when loading a disabled vehicle tire thereon, but after loading, it will be free rolling as a result of the disengagement of said brake shoe, and means to attach said body on said automobile after having mounted said disabled tire onto said body, thereby enabling to drive said automobile while pulling said body with said disabled vehicle tire carried by said body.

2. A support device according to claim 1, which comprises three free rolling wheels on said rear axle, three free rolling wheels on said front axle and a corresponding number of longitudinal slots formed on said longitudinal plate like member, so that if one of said rolling wheels ceases to operate or fails, the remaining rolling wheels will continue to provide adequate support.

3. A support device according to claim 1, which comprises a braking arm mounted alongside one said vertical plate, said arm being articulated at one end, the other end being provided with ground engaging teeth, so that when it is intended to unload said disabled vehicle tire, said braking arm is pivoted to engage said teeth with the hard surface, thereby preventing said device from moving in reverse direction during said unloading.

4. A supporting device according to claim 3, wherein said means to attach said body comprises a chain means fixed at one end on said body and at the other end on a safety hook provided on said automobile for that purpose.

5. A supporting device according to claim 3, wherein said chain means comprising two chain lengths, each being attached at a respective front corner of said body, a connector plate having an inverted V-shaped slot formed therein, and an enlargement at the apex of said inverted V-shaped slot, said enlargement enabling to pass said chain therethrough and to lockingly introduce a link into one of the legs of said inverted V-shaped slot on the distance requested of a specific length between the body and the connector plate, said connector plate having an attachment connected thereto by means of a chain, said attachment to engage said safety hook.

* * * * *